United States Patent
Galazin et al.

(10) Patent No.: US 9,189,881 B2
(45) Date of Patent: Nov. 17, 2015

(54) GRAPHICS PROCESSING

(71) Applicant: ARM Limited, Cambridge (GB)

(72) Inventors: Alexander Galazin, Trondheim (NO); Brian Pearson, Trondheim (NO); Andreas Danner Nilsen, Trondheim (NO); Joerg Wagner, Trondheim (NO)

(73) Assignee: ARM LIMITED, Cambridge (GB)

( * ) Notice: Subject to any disclaimer, the term of this patent is extended or adjusted under 35 U.S.C. 154(b) by 176 days.

(21) Appl. No.: 13/906,132

(22) Filed: May 30, 2013

(65) Prior Publication Data

US 2014/0354669 A1 Dec. 4, 2014

(51) Int. Cl.
| | |
|---|---|
| G06T 1/20 | (2006.01) |
| G06T 15/00 | (2011.01) |
| G09G 5/00 | (2006.01) |
| G06K 9/54 | (2006.01) |
| G06F 9/45 | (2006.01) |
| G06T 11/00 | (2006.01) |
| G09G 5/393 | (2006.01) |

(52) U.S. Cl.
CPC ............ *G06T 15/005* (2013.01); *G06T 11/001* (2013.01); *G09G 5/393* (2013.01)

(58) Field of Classification Search
USPC ......... 345/418–419, 423, 582, 501–502, 506, 345/522, 545; 382/303–305; 717/106, 114, 717/140
See application file for complete search history.

(56) References Cited

U.S. PATENT DOCUMENTS

| | | | | |
|---|---|---|---|---|
| 7,463,259 | B1 * | 12/2008 | Kolb et al. ................... | 345/426 |
| 7,750,913 | B1 * | 7/2010 | Parenteau et al. ............. | 345/502 |
| 7,800,620 | B2 * | 9/2010 | Tarditi et al. .................. | 345/505 |
| 2004/0237074 | A1 * | 11/2004 | Aronson et al. .............. | 717/158 |
| 2005/0081107 | A1 * | 4/2005 | DeWitt et al. ................. | 714/38 |
| 2006/0098018 | A1 * | 5/2006 | Tarditi et al. .................. | 345/505 |

OTHER PUBLICATIONS

"Using an Effect (Direct3D 9)—Improve Performance with Preshaders," 2013 Microsoft, Seattle, WA, USA, available at http://msdn.microsoft.com/en-us/library/windows/desktop/bb206299(v=vs.85).aspx.

"Materials Compendium—Custom," 2012 Epic Games, Inc., available at http://udn.epicgames.com/Three/MaterialsCompendium.html.

\* cited by examiner

*Primary Examiner* — Wesner Sajous
(74) *Attorney, Agent, or Firm* — Vierra Magen Marcus LLP

(57) ABSTRACT

In a graphics processing system that includes one or more programmable shading stages, the shader compiler receives a shader program to be compiled (step 40), identifies any run time constant expressions in the shader program (step 41), and removes such expressions from the original shader program, and substitutes them in the original main shader program with appropriate load instructions pointing to where the output results from a pilot shader program will be stored (step 42). The shader compiler then creates a separate pilot shader program for the identified run-time constant expressions (step 43). The pilot shader program is then executed on the graphics processing pipeline (step 44), before the modified main shader program (step 45).

20 Claims, 4 Drawing Sheets

GRAPHICS PROCESSING

BACKGROUND

The technology described herein relates to graphics processing and in particular to the operation of graphics processing systems that include one or more programmable processing stages ("shaders").

As is known in the art, graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders", which execute programs to perform graphics processing operations to generate the desired graphics data. For example, a graphics processing pipeline may include one or more of, and typically all of, a geometry shader, a vertex shader and a fragment (pixel) shader. These shaders are programmable processing stages that execute shader programs on input data values to generate a desired set of output data (e.g. appropriately transformed and lit vertex data in the case of a vertex shader) for processing by the rest of the graphics pipeline and/or for output. The shaders of the graphics processing pipeline may share programmable processing circuitry, or they may each be distinct programmable processing units.

As is known in the art, a shader program to be executed by a given "shader" of a graphics processing pipeline will be provided by the application that requires the graphics processing using a high-level shader programming language, such as GLSL, HLSL, OpenCL, etc. This shader program will consist of "expressions" indicating desired programming steps defined in the relevant language standards (specifications). The high-level shader program is then translated by a shader language compiler to binary code for the target graphics processing pipeline. This binary code will consist of "instructions" which are specified in the instruction set specification for the given target graphics processing pipeline. The compilation process for converting the shader language expressions to binary code instructions may take place via a number of intermediate representations of the program within the compiler, as is known in the art. Thus the program written in the high-level shader language may be translated into a compiler specific intermediate representation (and there may be several successive intermediate representations within the compiler), with the final intermediate representation being translated into the binary code instructions for the target graphics processing pipeline.

Thus, references to "expressions" herein, unless the context otherwise requires, refer to shader language constructions that are to be compiled to a target graphics processor binary code (i.e. are to be expressed in hardware microinstructions). (As is known in the art, such shader language constructions may, depending on the shader language in question, be referred to as "expressions", "statements", etc. For convenience, the term "expressions" will be used herein, but this is intended to encompass all equivalent shader language constructions such as "statements" in GLSL.) "Instructions" correspondingly refer to the actual hardware instructions (code) that are emitted to perform an "expression".

When a graphics processing output (e.g. a frame for display) is required, the graphics processing pipeline will be provided with a set of "commands" to generate the desired output. These "commands" are usually in the form of draw call descriptors which define respective draw calls to be executed by the graphics processing pipeline. These draw calls and their descriptors are generated in response to commands from an application running on a host system for graphics processing. A given draw call may use some or all of the graphics processing pipeline stages.

The Applicants believe that there remains scope for improvements to the operation of graphics processing pipelines that include one or more shader stages.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
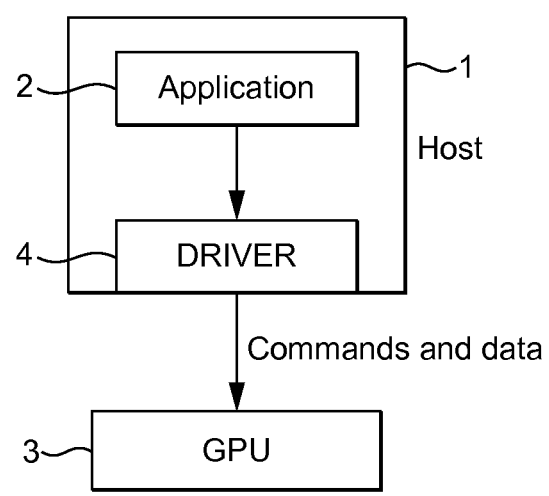
FIG. 1 shows an exemplary computer graphics processing system.

A first embodiment of the technology described herein comprises a method of operating a graphics processing system which includes a graphics processing pipeline that includes one or more programmable shading stages which execute graphics shader programs to perform graphics processing operations, the method comprising:
  identifying in a shader program to be executed on the graphics processing pipeline program expressions that operate on run time constant inputs;
  creating a new shader program containing instructions for executing the identified expressions; and
  creating a modified version of the original shader program in which the instructions for the identified expressions from the original shader program have been removed and replaced with load instructions pointing to the output data of the new shader program;
  executing the new shader program containing the instructions for executing the identified expressions on the graphics processing pipeline so as to generate and store the output values for those expressions; and
  subsequently executing the modified original shader program on the graphics processing pipeline, including in response to the load instructions that have been substituted into that shader program, loading the stored output values generated by the new shader program for processing by the modified original shader program.

A second embodiment of the technology described herein comprises a system for processing graphics comprising:
  a graphics processing pipeline that includes one or more programmable shading stages which execute graphics shader programs to perform graphics processing operations; and
  a processor configured to:
  identify in a shader program to be executed on the graphics processing pipeline program expressions that operate on run time constant inputs;
  create a new shader program containing instructions for executing the identified expressions; and
  create a modified version of the original shader program in which the instructions for the identified expressions from the original shader program have been removed and replaced with load instructions pointing to the output data of the new shader program; and further configured to cause the graphics processing pipeline to:

execute the new shader program containing the instructions for executing the identified expressions on the graphic processing pipeline so as to generate and store the output values for those expressions; and subsequently execute the modified original shader program on the graphics processing pipeline, including in response to the load instructions that have been substituted into that shader program, loading the stored output values generated by the new shader program for processing by the modified original shader program.

The technology described herein identifies the presence of expressions in a shader program to be executed that will operate on run time (i.e. when the application is being executed) constant inputs, and then, in effect, extracts those expressions and executes them in a separate, initial, "pilot" shader program in advance of the "main" shader program. This then has the advantage that those expressions (the instructions emitted for those expressions) may be executed only once in the initial, pilot shader program, rather than having to be executed multiple times in the main shader program each time the result for the expression in question is required. This can therefore remove repeated redundant calculations from the shading process. Thus, in effect, calculations in the shader program that are dependent on run time constant values are run once on the graphics processing pipeline as a "pilot" shader, with the main shader program then being configured to be smaller and to use the results of the pilot shader.

The Applicants have recognised in this regard that there may be expressions in a shader program to be executed by a graphics processing pipeline for which the run time inputs may be constant, but for which it may not be known what the input values will actually be until run time (for example because they may be dependent upon textures being looked up). Thus it is not possible simply to execute all these expressions in advance, e.g. on the host processor, because the actual values of the inputs may not be known until run time. The technology described herein addresses this by creating a separate "pilot", shader program of these run time constant expressions that is executed on the graphics processing pipeline in advance of the main shader program.

Executing the "pilot" shader program on the graphics processing pipeline ensures that the results and execution of the program are guaranteed to be exactly the same as if the main shader program was performed in the normal manner on the graphics processing pipeline. It also facilitates re-use of the already existing programmable processing stages (execution engine) on the graphics processing pipeline, and thus avoids the need to develop any code necessary to emulate the operation on the host processor.

The programmable processing stages of the graphics processing pipeline can comprise any desired and suitable such stages. In an embodiment, the graphics processing pipeline includes one or more, and in an embodiment all of: a geometry shader, a hull shader, a domain shader, a vertex shader and a fragment (pixel) shader.

The technology described herein can be used in respect of any desired shader program to be executed by the graphics processing pipeline. It may be applied in respect of some but not all of the shader programs to be executed for a given graphics processing operation (e.g. draw call), but in an embodiment is performed in respect of all shader programs to be executed for a given graphics processing operation (e.g. draw call) (where run time constant expressions exist).

Thus in an embodiment, the process is repeated for a second shader program (and so on, if there are further shader programs).

The expressions that operate on run time constant inputs may be any suitable and desired such expressions, such as expressions that refer to "uniforms" (in a GLSL shader program) and samplers having no varying input.

In an embodiment the expressions that operate on run time constant inputs comprise one or more of, and in an embodiment all of: a global variable that is known to be constant for a particular draw call; a constant expression as defined in a shader language specification; a shader language expression formed by an operator on operands that are all run time constant expressions; and a shader language construction that is defined in the language specification as a constant expression and for which all its operands are run time constants.

The identification of the expressions that operate on run time constant inputs, and the corresponding creation of the new "pilot" shader program and the modification of the main shader program, can be performed as desired.

Thus, for example, the identification of the expressions that operate on run time constant inputs can identify those expressions in any suitable form in the, e.g., compilation process, for example as "expressions" in the high level shader language, or as a corresponding set of instructions in the target code for the graphics processing pipeline, or as an appropriate set of "operations" in some intermediate representation of the shader program. Similarly, the new shader program containing instructions for executing the identified expressions may be created in the form of a higher level shader language program that is then subsequently converted to the necessary instructions for execution on the graphics processing pipeline, or may be created directly as a set of instructions to be executed on the graphics processing pipeline, or may be created in the form of some intermediate representation that is then converted to the instructions for the graphics processing pipeline. Thus, the identification of the expressions that operate on run time constant inputs may be carried out on or using an intermediate representation of the original shader program, and the creation of the corresponding new "pilot" shader program may equally create that pilot shader program in the form of an intermediate representation that will then be translated to binary code "instructions" for the graphics processing pipeline.

The identification of the expressions that operate on run time constant inputs, and the corresponding creation of the new "pilot" shader program and the modification of the main shader program, can equally be performed in and by any suitable stage or component of the graphics processing system.

In an embodiment, the compiler for the shader in question performs this operation. Thus, in an embodiment the shader compiler for the graphics processing pipeline performs this operation and/or the respective vertex shader compiler, fragment shader compiler, etc. performs this operation, as appropriate (where there are distinct compilers).

As discussed above, a shader program to be executed by a given programmable stage will normally be provided by the application that requires the graphics processing using a high-level shader programming language, such as GLSL, HLSL, OpenCL, etc. This shader program is then translated by a shader language compiler to binary code for the target graphics processing pipeline. Thus in order to implement the technology described herein, in an embodiment the shader compiler identifies run time constant expressions in the shader program in question, prevents the instructions for executing those expressions from being emitted into the target graphics processing pipeline binary code, creates instead a separate binary code that contains hardware instructions for the identified expressions only, together with any necessary metadata (which together form the "pilot" shader), and then provides the relevant binary code (and metadata) to the graphics processing pipeline for execution.

The metadata should include the information (if any) necessary to execute the "pilot" shader program on the graphics processing pipeline and to be able later to fetch the result(s) of the pilot shader program. Thus, the metadata may comprise, for example, one or more of: the memory layout for the inputs, the memory layout for the outputs, and/or a description of where the outputs are written. The metadata can be different for different architectures/implementations.

The extracted run time constant expressions (the instructions for the extracted run time constant expressions) (the pilot shader) should be executed on the graphics processing pipeline so that all those instructions and calculations are done before the modified main shader program is invoked. In an embodiment the driver for the graphics processing pipeline ensures that this is the case. This timing of execution of the pilot shader means that the dependency on the state of the sample buffer will have been resolved (by the driver), and so no additional synchronisation points that slow down deferred buffer writes will be required.

In an embodiment the created, new shader program (the extracted shader expressions (the pilot shader)) is executed after data for the draw call to which the main original shader program(s) relates has been initialised, but before the corresponding draw call stage (before the actual draw call processing is performed). Thus, in an embodiment, the created, new "pilot" shader program is executed when all conditions for the execution of the main (original) shader program(s) have been met (and before the main shader program(s) is executed). In an embodiment, the process is organised as follows (in an embodiment by the run time driver for the graphics processing pipeline): the data required by the draw calls for the graphics processing output to be generated is initialised, a dependency chain of necessary processing jobs for the draw call stages and pilot shaders is created, and then those processing jobs are sent to the graphics processing pipeline for execution.

The output of the pilot shader program can be stored as desired. The output values should be stored in such a manner that those values can be loaded and treated as input values by the modified original main shader program when the substituted load instructions in that program are executed. Thus, the output of the pilot shader program is in an embodiment a memory area storing input values for the follow-up main shader program. This memory area may be any storage accessible in a shader program via graphics processing pipeline instructions (such as main memory, stack memory, a tile buffer, uniform memory, and so on). This memory area may, e.g., be addressed directly, be remapped as a colour buffer (render target), or be remapped as the pilot shader's stack area. In an embodiment, the output of the pilot shader is mapped as (written to) a colour buffer (render target), and that output colour buffer of the pilot shader is then mapped to the input uniform of the corresponding modified original main shader program (i.e. the load instructions that are substituted into the main shader program point to and instruct loads from an output colour buffer that will be generated by the pilot shader).

The programmable, shading stages of the graphics processing pipeline such as the vertex shader, fragment shader, etc., can be implemented as desired and in any suitable manner, and can perform any desired and suitable shading, e.g. vertex shading, fragment shading, etc., functions, respectively and as appropriate. In the case of a fragment shader, for example, the fragment shader may render a primitive or primitives to generate a set of render output values, e.g. representing a frame for display. These output values may then be exported to external memory for storage and use, such as to a frame buffer for a display.

Each programmable processing stage (shader) may comprise any suitable programmable hardware element such as programmable processing circuitry. Each programmable processing stage (shader) may be provided as a separate circuit element to other programmable stages (shaders) of the processing pipeline or the programmable processing stages may share some or all of their programmable processing circuitry (that is then differently programmed to serve as the desired programmable processing stage (shader)).

As well as the programmable processing (shader) stages, the graphics processing pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processing pipeline may be used to generate, such as frames for display, render-to-texture outputs, etc. The output, e.g. fragment shaded, data values from the graphics processing are in an embodiment exported to external, e.g. main, memory, for storage and use, such as to a frame buffer for a display.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

The technology described herein is applicable to any suitable form or configuration of graphics processor. It is particularly applicable to tile-based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or microprocessor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing system and pipeline can otherwise include any one or more or all of the usual functional units, etc., that graphics processing pipelines include.

It will also be appreciated by those skilled in the art that all of the described embodiments of the technology described herein can, and in embodiments do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

As is known in the art, the "commands" to the graphics processor 3 to generate an output (e.g. to render frames for display) will be provided to the graphics processing pipeline 3 in the form of draw call descriptors that are generated in response to commands from the application 2 running on the host system 1 for graphics processing. In practice there will be plural draw calls executed, each having a corresponding draw call descriptor, as is known in the art. Where plural draw calls are to be executed, each draw call has a descriptor and the draw call descriptors are stored as a linked list of draw call descriptors. Each draw call will use some but not necessarily all (but can use all) of the stages of the graphics processing pipeline. Each separate draw call may be treated and processed in the manner of the present embodiment.

Figure 2:
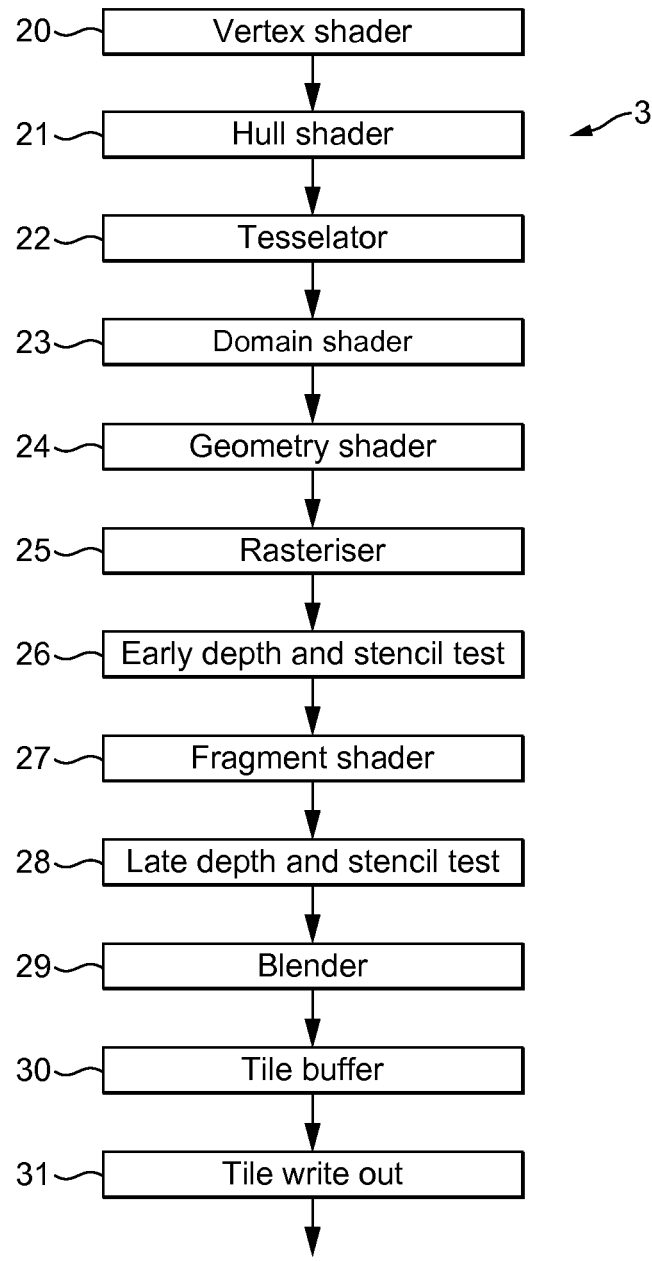
FIG. 2 shows schematically a graphics processing pipeline that can be operated in the manner of the technology described herein.

FIG. 2 shows the graphics processing pipeline 3 of the present embodiment in more detail.

The graphics processing pipeline 3 shown in FIG. 2 is a tile-based renderer and will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

(As is known in the art, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20, as is known in the art, takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

As is known in the art, the hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates, as is known in the art, to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs, is known in the art, a Z (depth) test on fragments it receives from the rasteriser 25, to see if any fragments can be discarded (culled) at this stage.

To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer will store, as is known in the art, colour and depth buffers that store an appropriate colour, etc., or Z-value, respectively, for each sampling point that the buffers represent (in essence for each sampling point of a tile that is being processed).) These buffers store, as is known in the art, an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

In the present embodiment, the tile buffer stores its fragment data as 32×32 arrays (i.e. corresponding to a 32×32 array of sample positions in the output to be generated, e.g., in the image to be displayed). Each 32×32 data position array in the tile buffer can accordingly correspond to (and will "natively" support) a 16×16 pixel "tile" of, e.g., the frame to be displayed, at 4× anti-aliasing (i.e. when taking 4 samples per pixel).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 3 includes a number of programmable processing or "shader" stages, namely the verbex shader 20, hull shader 21, domain shader 23, geometry shader 24, and the fragment shader 27. These programmable shader stages execute respective shader programs that have one or more input variables and generate sets of output variables and that are provided by the application. To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include, as is known in the art, the creation of one or more intermediate representations of the program within the compiler. (The compiler may, e.g., be part of the driver 4, with there being a special API call to cause the compiler to run. The compiler execution can thus be seen as being part of the draw call preparation done by the driver in response to API calls generated by an application).

Shader programs typically contain constant expressions (constructions expressed in a shader language that have constant inputs). These constant expressions can be classified into two types: compile time constant expressions (defined in language specifications (such as literal values, an arithmetic operator with constant arguments, etc.)): and run time constant expressions. Run time constant expressions are not defined anywhere, but can be seen as a global variable that is known to be constant for a particular draw call (i.e. for all pipeline stages used within the draw call) and all operations in a shader program that depend only on the global variable in question. In the case of run time constant expressions, the value of the variable is not known by the compiler at compile time. An example of such a variable is an expression qualified as "uniform" in a GLSL shader program.

In the present embodiment the expressions that operate on run time constant inputs comprise: global variables that are known to be constant for a particular draw call; constant expressions as defined in a shader language specification; shader language expressions formed by an operator on operands that are all run time constant expressions; and shader language constructions that are defined in the language specification as constant expressions and for which all the operands are run time constants.

The present embodiment operates to identify such run time constant expressions in shader programs and to extract them from the main shader program and to instead execute them in an initial shader program (a "pilot" shader program).

To do this, the shader compiler identifies such run time constant expressions in a given shader program to be executed, removes such expressions from the original shader program (prevents such expressions from being emitted into the target GPU code), and creates a separate shader program (binary code) that contains hardware instructions only for the identified expressions together with metadata for those expressions to thereby create a "pilot" shader program that can be executed in advance of the main shader program. The metadata includes the information necessary to execute the "pilot" shader program on the graphics processing pipeline and to be able later to fetch the result(s) of the pilot shader program. Thus, the metadata may comprise, for example, one or more of the memory layout for the inputs, the memory layout for the outputs, and/or a description of where the outputs are written. The metadata can be different for different architectures/implementations.

The compiler also substitutes the original run time constant expressions in the main shader program with appropriate load instructions pointing to where the output results from the pilot shader program will be stored.

This is done for some and in an embodiment all of the shader programs to be executed for a given desired graphics processing output.

Figure 3:
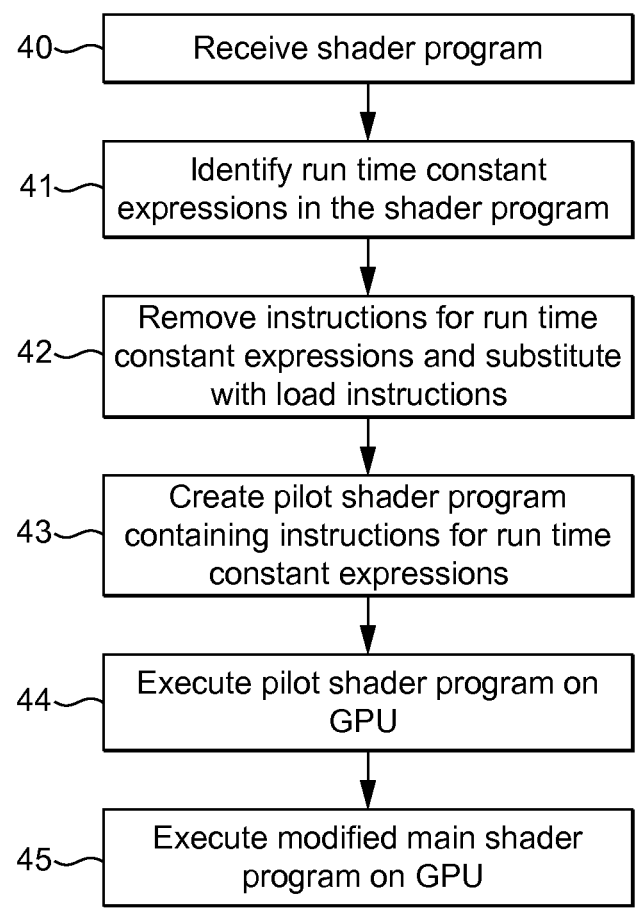
FIGS. 3 and 4 show schematically embodiments of the operation of the graphics processing system of FIG. 1.

FIG. 3 illustrates this process. As shown in FIG. 3, the shader compiler will receive a shader program in a high level programming language to be compiled (step 40), and first identify any run time constant expressions in the shader program (step 41). It will then remove instructions emitted for such expressions from the original shader program, and substitute them in the original main shader program with appropriate load instructions pointing to where the output results from the pilot shader program will be stored (step 42). The shader compiler then creates a separate shader program (binary code) that contains hardware instructions only for the identified run-time constant expressions together with any necessary metadata for those instructions to thereby create a "pilot" shader program (step 43) that can be executed in advance of the main shader program.

In the present embodiment, the compiler configures the pilot shader programs such that they output to a colour buffer (render target) in the tile buffer 30. The corresponding load instructions substituted into the main shader program then map to this colour buffer so that the main shader program will use the results of the pilot shader program as its inputs (where required). Other arrangements for the output of the pilot shader, such as remapping the pilot shader's stack area, can be used, if desired. In general any storage accessible in a shader program via graphics processing pipeline instructions (such as main memory, stack memory, a tile buffer, uniform memory, and so on) can be used for the output of the pilot shader program.

Once the pilot and main shader programs for execution have been compiled, the pilot shader program is executed on the graphics processing pipeline 3 (step 44), followed by the modified main shader program (step 45). To do this, the driver 4 on the host processor 1 for the graphics processing unit 3 initialises the data required by the draw calls, creates a dependency chain of necessary jobs for the draw call stages and pilot shaders, and then sends the jobs to the graphics processing pipeline 3 for execution. The driver ensures that the created pilot shader programs are executed after the relevant draw call's data has been initialised, but before the corresponding draw call stage is activated (i.e. before the main shader program is executed). This then ensures that the pilot shader is executed on the graphics processing unit 3 so that all its calculations are done before the main shader program is invoked.

The time dependencies for this operation can be expressed as follows:

$$\text{TIME}(\text{DCI}(i)) < \text{TIME}(\text{PS}(i,j)) < \text{TIME}(\text{DCP}(i,j))$$

Figure 4:
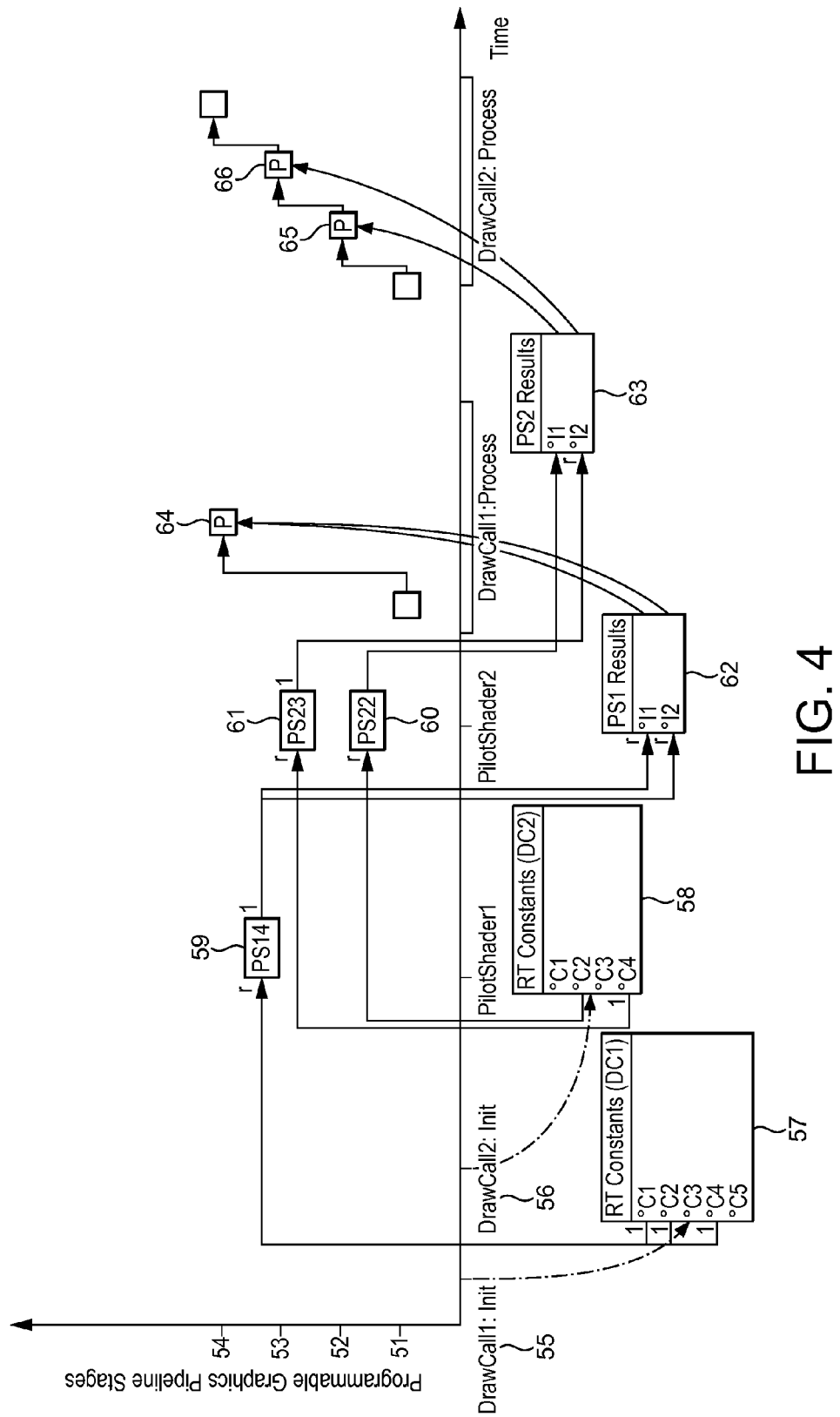

Where
PS=Pilot Shader
DCI=draw call initialisation
DCP=draw call processing (actual rendering)
i=draw call number
j=pipeline stage number FIG. 4 shows schematically an example of this operation of the present embodiment. In the arrangement in FIG. 4, it is assumed that there are four programmable pipeline stages, 51, 52, 53 and 54, and that an application has requested the processing of two draw calls. It is further assumed that the first draw call, DrawCall1 uses programmable stages 51 and 54, whereas the second draw call, DrawCall2 uses programmable stages 51, 52, 53 and 54. This is shown schematically on FIG. 4.

As shown in FIG. 4, the first step is to initialise the two draw calls 55, 56. As part of this process respective runtime constant expressions are identified and stored in respective tables 57, 58.

In this example, it is assumed that for the first draw call, DrawCall1, the compiler identifies that the shader program for the programmable processing stage 54 contains run time constant expressions. In view of this, the compiler creates a pilot shader program PS14, 59 to execute these expressions.

Similarly, for the second Draw Call, DrawCall2, it is determined that the shader programs for the programmable stages 52 and 53 contain run time constant expressions and the compiler correspondingly creates pilot shaders PS22, 60, and PS23, 61 to execute these expressions. (In this example, Pilot Shader 1 and Pilot Shader 2 stand for sets of pilot shaders associated with DrawCall1 or DrawCall2, respectively.)

The compiler also identifies that there are two independent chains of operations dependent on run time constants in the first draw call (DrawCall1) shader program for the fourth programmable processing stage 54.

Once this has been done and the pilot shaders have been generated, the driver then causes the first pilot shader PS14 to be executed 59. This pilot shader accordingly reads run time constant global variables C1, C2, C4 from the table 57 of input run time constants for the first draw call, DrawCall1, and writes its results (its output values) into an intermediate table PS1 Results, 62 (the fact that there were two independent chains of operations is shown by the fact that there are two intermediate results in the table 62).

Next, pilot shaders PS22 and PS23 are executed 60, 61. These pilot shaders read run time constants C2, C4 (not necessarily the same as for pilot shader 1) from the table 58 of input run time constants for the second draw call, DrawCall2, and write the results of their processing into an intermediate table PS2 Results 63.

Then, as shown in FIG. 4, the draw calls are executed one after another, with the relevant pilot shader results stored in the intermediate tables being used by the appropriate processing stages when executing the draw call processes. Thus the pilot shader PS14 results 62 are used by the programmable processing stage 54 when executing the DrawCall1 process 64, and the pilot shader PS22 and pilot shader PS33 results 63 are used by the processing stages 52 and 53 when executing the second draw call process, 65, 66, as shown in FIG. 4.

This operation will be repeated for each respective draw call, etc., that is to be processed.

It can be seen from the above, that the technology described herein, in its embodiments at least, facilitates the removal of repeated redundant calculations in shader operations of a graphics processing pipeline. This is achieved, embodiments of the technology described herein at least, by identifying and extracting calculations dependent only on run time constant values from a shader program and executing those calculations instead in a pilot shader program that is executed on the graphics processing pipeline in advance of the main shader program. The main shader program then uses the results of the pilot shader program instead of performing the calculations itself.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system which includes a graphics processing pipeline that includes one or more programmable shading stages which execute graphics shader programs to perform graphics processing operations, the method comprising:
    identifying in an original shader program to be executed on the graphics processing pipeline program expressions that operate on run time constant inputs;
    creating a new shader program containing instructions for executing the identified program expressions;
    creating a modified version of the original shader program, the creating the modified version of the original shader program including removing the instructions for executing the identified program expressions from the original shader program and replacing the instructions for executing the identified program expressions with load instructions pointing to output values generated and stored for the identified program expressions by executing the new shader program;
    executing the new shader program containing the instructions for executing the identified program expressions on the graphics processing pipeline, the executing the new shader program including generating and storing the output values for the identified program expressions; and
    subsequently executing the modified version of the original shader program on the graphics processing pipeline, the subsequently executing the modified version of the original shader program including, in response to the load instructions of the modified version of the original shader program, loading the output values generated and stored by executing the new shader program for processing by the modified version of the original shader program.

2. The method of claim 1 wherein the one or more programmable shading stages of the graphics processing pipeline comprise one or more of: a geometry shader, a hull shader, a domain shader, a vertex shader and a fragment shader.

3. The method of claim 1, further comprising performing the method for plural original shader programs for a draw call.

4. The method of claim 1, wherein a compiler for a programmable shading stage of the graphics processing pipeline performs:
the identifying in the original shader program to be executed on the graphics processing pipeline program expressions that operate on run time constant inputs;
the creating the new shader program containing instructions for executing the identified program expressions; and
the creating the modified version of the original shader program, the creating the modified version of the original shader program including removing the instructions for executing the identified program expressions from the original shader program and replacing the instructions for executing the identified program expressions with load instructions pointing to output values generated and stored for the identified program expressions by executing the new shader program.

5. The method of claim 1, comprising:
a shader compiler identifying the program expressions in the original shader program, preventing instructions for the identified program expressions from being emitted into the graphics processing pipeline's binary code, creating a separate binary code that contains hardware instructions for the identified program expressions only, together with metadata for the identified program expressions, and then providing the separate binary code to the graphics processing pipeline for execution.

6. The method of claim 1, wherein a driver for the graphics processing pipeline ensures that the new shader program is executed before the modified version of the original shader program.

7. The method of claim 1, wherein the new shader program is executed after data for a draw call to which the original shader program relates has been initialised, but before the actual draw call processing is performed.

8. The method of claim 1, wherein the new shader program is executed when all conditions for execution of the original shader program have been met.

9. The method of claim 1, wherein the output values of the new shader program are written to a colour buffer, and the load instructions of the modified version of the original shader program point to that output colour buffer that will be generated by the new shader program.

10. The method of claim 1, wherein the graphics processing pipeline is a tile-based graphics processing pipeline.

11. A system for processing graphics comprising:
a graphics processing pipeline that includes one or more programmable shading stages which execute graphics shader programs to perform graphics processing operations; and
a processor configured to:
identify in an original shader program to be executed on the graphics processing pipeline program expressions that operate on run time constant inputs;
create a new shader program containing instructions for executing the identified program expressions;
create a modified version of the original shader program, the creating the modified version of the original shader program including removing the instructions for executing the identified program expressions from the original shader program and replacing the instructions for executing the identified program expressions with load instructions pointing to output values generated and stored for the identified program expressions by executing the new shader program;
execute the new shader program containing the instructions for executing the identified program expressions on the graphics processing pipeline, the executing the new shader program including generating and storing the output values for the identified program expressions; and
subsequently execute the modified version of the original shader program on the graphics processing pipeline, the subsequently executing the modified version of the original shader program including, in response to the load instructions of the modified version of the original shader program, loading the output values generated and stored by executing the new shader program for processing by the modified version of the original shader program.

12. The system of claim 11 wherein the one or more programmable shading stages of the graphics processing pipeline comprise one or more of: a geometry shader, a hull shader, a domain shader, a vertex shader and a fragment shader.

13. The system of claim 11, wherein a compiler for a programmable shading stage of the graphics processing pipeline is configured to:
identify in the original shader program to be executed on the graphics processing pipeline program expressions that operate on run time constant inputs;
create the new shader program containing instructions for executing the identified program expressions; and
create the modified version of the original shader program, the creating the modified version of the original shader program including removing the instructions for executing the identified program expressions from the original shader program and replacing the instructions for executing the identified program expressions with load instructions pointing to output values generated and stored for the identified program expressions by executing the new shader program.

14. The system of claim 11, wherein a shader compiler is configured to identify the program expressions in the original shader program, prevent instructions for the identified program expressions from being emitted into the graphics processing pipeline's binary code, create a separate binary code that contains hardware instructions for the identified program expressions only, together with metadata for the identified program expressions, and then provide the separate binary code to the graphics processing pipeline for execution.

15. The system of claim 11, wherein a driver for the graphics processing pipeline is configured to ensure that the new shader program is executed before the modified version of the original shader program.

16. The system of claim 11, wherein the new shader program is executed after data for a draw call to which the original shader program relates has been initialised, but before the actual draw call processing is performed.

17. The system of claim 11, wherein the new shader program is executed when all conditions for the execution of the original shader program have been met.

18. The system of claim 11, wherein the output values of the new shader program are written to a colour buffer, and the load instructions of the modified version of the original shader program point to that output colour buffer that will be generated by the new shader program.

19. The system of claim 11, wherein the graphics processing pipeline is a tile-based graphics processing pipeline.

20. A non-transitory computer readable storage medium storing computer software code which when executing on a processor performs a method of operating a graphics processing system which includes a graphics processing pipeline that includes one or more programmable shading stages which execute graphics shader programs to perform graphics processing operations, the method comprising:

identifying in an original shader program to be executed on the graphics processing pipeline program expressions that operate on run time constant inputs;

creating a new shader program containing instructions for executing the identified program expressions;

creating a modified version of the original shader program, the creating the modified version of the original shader program including removing the instructions for executing the identified program expressions from the original shader program and replacing the instructions for executing the identified program expressions with load instructions pointing to output values generated and stored for the identified program expressions by executing the new shader program;

executing the new shader program containing the instructions for executing the identified program expressions on the graphics processing pipeline, the executing the new shader program including generating and storing the output values for the identified program expressions; and subsequently executing the modified version of the original shader program on the graphics processing pipeline, the subsequently executing the modified version of the original shader program including, in response to the load instructions of the modified version of the original shader program, loading the output values generated and stored by executing the new shader program for processing by the modified version of the original shader program.

* * * * *